United States Patent
Tsukada et al.

(10) Patent No.: US 10,147,954 B2
(45) Date of Patent: Dec. 4, 2018

(54) POSITIVE ELECTRODE FOR AIR CELL AND MANUFACTURING METHOD THEREOF

(71) Applicant: NISSAN MOTOR CO., LTD., Yokohama-shi, Kanagawa (JP)

(72) Inventors: Yoshiko Tsukada, Yokohama (JP); Kazufumi Kodama, Zushi (JP); Shigemasa Kuwata, Yokohama (JP); Atsushi Miyazawa, Kamakura (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/394,175

(22) PCT Filed: Mar. 8, 2013

(86) PCT No.: PCT/JP2013/056419
§ 371 (c)(1),
(2) Date: Oct. 13, 2014

(87) PCT Pub. No.: WO2013/157317
PCT Pub. Date: Oct. 24, 2013

(65) Prior Publication Data
US 2015/0086883 A1 Mar. 26, 2015

(30) Foreign Application Priority Data

Apr. 18, 2012 (JP) .................................. 2012-094529
Mar. 6, 2013 (JP) .................................. 2013-043660

(51) Int. Cl.
*H01M 12/06* (2006.01)
*H01M 4/86* (2006.01)
(Continued)

(52) U.S. Cl.
CPC ......... *H01M 4/8626* (2013.01); *B29C 41/003* (2013.01); *B29C 41/22* (2013.01);
(Continued)

(58) Field of Classification Search
CPC ............................ H01M 12/08; H01M 12/065
See application file for complete search history.

(56) References Cited

U.S. PATENT DOCUMENTS 4,828,939 A * 5/1989 Turley ................ H01M 4/8626
429/403
5,432,022 A 7/1995 Cheiky
(Continued)

FOREIGN PATENT DOCUMENTS

CN 200091417 Y 8/2007
EP 1 484 810 A1 12/2004
(Continued)

OTHER PUBLICATIONS

Machine translation of JP 07-211322 A, Aug. 11, 1995, retrieved Apr. 11, 2016.*

(Continued)

*Primary Examiner* — Maria Laios
*Assistant Examiner* — Robert S Carrico
(74) *Attorney, Agent, or Firm* — Foley & Lardner LLP (57) ABSTRACT

A positive electrode (10) for an air cell of the present invention includes: a catalyst layer (11) composed of a porous layer containing electrical conductive carbon (1), a binder (2), and a catalyst component (3); and a fluid-tight gas-permeable layer (12) composed of a porous layer containing an electrical conductive carbon (1a) and a binder (2). The fluid-tight gas-permeable layer is stacked on the catalyst layer. This configuration can facilitate series connection of the air cells while preventing electrolysis solution from leaking out of a positive electrode. It is therefore possible to (Continued)

enhance the manufacturing efficiency and handleability of the air cells.

19 Claims, 2 Drawing Sheets

(51) Int. Cl.
| | |
|---|---|
| H01M 4/88 | (2006.01) |
| H01M 12/08 | (2006.01) |
| B29C 41/00 | (2006.01) |
| B29C 41/22 | (2006.01) |
| B29C 41/36 | (2006.01) |
| B29C 41/42 | (2006.01) |
| B29C 41/46 | (2006.01) |
| B29K 27/18 | (2006.01) |
| B29K 105/00 | (2006.01) |
| B29K 105/04 | (2006.01) |
| B29L 31/34 | (2006.01) |

(52) U.S. Cl.
CPC ............ *B29C 41/36* (2013.01); *B29C 41/42* (2013.01); *B29C 41/46* (2013.01); *H01M 4/8605* (2013.01); *H01M 4/8642* (2013.01); *H01M 4/8657* (2013.01); *H01M 4/8673* (2013.01); *H01M 4/8807* (2013.01); *H01M 4/8814* (2013.01); *H01M 4/8828* (2013.01); *H01M 4/8882* (2013.01); *H01M 12/06* (2013.01); *H01M 12/08* (2013.01); B29K 2027/18 (2013.01); B29K 2105/0023 (2013.01); B29K 2105/04 (2013.01); B29K 2995/0065 (2013.01); B29L 2031/3468 (2013.01); H01M 4/8668 (2013.01); H01M 2004/8689 (2013.01); Y02E 60/128 (2013.01)

(56) References Cited

U.S. PATENT DOCUMENTS

| | | | |
|---|---|---|---|
| 6,127,060 A | * | 10/2000 | Read .................... 429/403 |
| 7,285,354 B2 | | 10/2007 | Ueyama et al. |
| 2004/0209138 A1 | | 10/2004 | Ueyama et al. |
| 2006/0204833 A1 | * | 9/2006 | Nomi ................. H01M 4/8605 |
| | | | 429/413 |
| 2007/0160898 A1 | | 7/2007 | Takamura et al. |
| 2008/0299456 A1 | * | 12/2008 | Shiga .................... H01M 4/86 |
| | | | 429/212 |
| 2010/0086849 A1 | | 4/2010 | Mizuno et al. |
| 2011/0236799 A1 | * | 9/2011 | Burchardt ........... H01M 2/1653 |
| | | | 429/534 |
| 2012/0021303 A1 | * | 1/2012 | Amendola .............. H01M 4/42 |
| | | | 429/406 |
| 2012/0308902 A1 | * | 12/2012 | Mizuno ................ B82Y 30/00 |
| | | | 429/405 |

FOREIGN PATENT DOCUMENTS

| | | | |
|---|---|---|---|
| JP | 6-267594 A | | 9/1994 |
| JP | 7-211322 A | | 8/1995 |
| JP | 10228914 A | * | 8/1998 |
| JP | 11-54130 A | | 2/1999 |
| JP | WO 2011074122 A1 | * | 6/2011 ............ B82Y 30/00 |
| JP | 2011-181374 A | | 9/2011 |
| WO | WO 03/077336 A1 | | 9/2003 |
| WO | WO 2008/058165 A2 | | 5/2008 |

OTHER PUBLICATIONS

Machine translation of JP 10-228914 A, retrieved Sep. 11, 2017 (Year: 1998).*
European Extended Search Report, dated Mar. 11, 2015, 8 pages.
Taiwanese Office Action, dated Jun. 9, 2014, 5 pages.

* cited by examiner

POSITIVE ELECTRODE FOR AIR CELL AND MANUFACTURING METHOD THEREOF

TECHNICAL FIELD

The present invention relates to a positive electrode used in air cells. Specifically, the present invention relates to a positive electrode for air cells which can prevent leakage of electrolysis solution and implement excellent handleability and easy series connection of the air cells.

BACKGROUND ART

Air cells are power supplies which are economical because the cells use oxygen in the air as an active material and can be used for a long period of time without maintenance. As the conventional air cells, button-type air cells are known. A button-type air cell uses a casing assembly in which a metallic negative electrode casing and a metallic positive electrode casing having air holes are fitted to each other with a gasket interposed therebetween. Within the casing assembly, a negative electrode, an electrolysis solution, a separator, an air electrode (a positive electrode), a water-repellent film, and the like are arranged.

In the button-type air cell as described above, the internal space of the casing assembly is divided by the separator. One of the divided spaces is filled with zinc and electrolysis solution, in which zinc is immersed, to serve as the negative electrode, and the other space includes a catalyst to serve as the air electrode (the positive electrode). The water-repellent film is composed of porous membrane made of polytetrafluoroethylene (PTFE) and is provided on the surface of the air electrode opposite to the separator. Diffusion paper is tightly attached to the water-repellent film.

In the button-type air cell, oxygen in the air as a positive electrode active material is introduced through the air holes provided in the bottom of the positive electrode casing and is supplied to the air electrode through the diffusion paper and water-repellent film. In this configuration, the diffusion paper serves a function of uniformly supplying oxygen to the entire surface of the air electrode. The water-repellent film serves a function of supplying oxygen to the inside of the cell (the positive electrode) and a function of preventing the electrolysis solution from leaking out of the cell through the air holes.

Among the air cells configured as described above, there is a known air cell in which a catalyst layer is provided on a gas diffusion layer and a current collector is eccentrically located in the gas diffusion layer side of the catalyst layer (see Patent Literature 1, for example). This air cell further includes an air electrode shaped in a truncated cone decreasing in diameter in the direction from the gas diffusion layer to the top surface of the catalyst layer. This button-type air cell can prevent chunks of catalyst produced by collapse of the catalyst layer from entering gaps between constituent parts as foreign objects and is therefore excellent in liquid leakage resistance.

CITATION LIST

Patent Literature

Patent Literature 1: Japanese Patent Unexamined Publication No. 11-54130

SUMMARY OF INVENTION

In the conventional button-type air cells, the leakage of electrolysis solution due to chunks of catalyst can be prevented, but the leakage of electrolysis solution through the air holes is still prevented by water-repellent film made of PTFE separately provided from the air electrode (the positive electrode) as used to be. Moreover, the water-repellent film could reduce the electrical conductivity, and it is therefore necessary to provide the current collector in the catalyst layer.

The present invention was made in the light of the problems included in the conventional techniques. An object of the present invention is to provide a positive electrode for air cells which can prevent leakage of electrolysis solution and is useful for series connection of the air cells while enhancing the manufacturing efficiency and handleability of the air cells, and to provide a method of manufacturing the positive electrode for air cells.

A positive electrode for an air cell according to an aspect of the present invention includes: a catalyst layer composed of a porous layer containing electrical conductive carbon, a binder, and a catalyst component; and a fluid-tight gas-permeable layer composed of a porous layer containing electrical conductive carbon and a binder, in which the fluid-tight gas-permeable layer is stacked on the catalyst layer.

DESCRIPTION OF EMBODIMENTS

Hereinafter, a description is given of a positive electrode for an air cell according to an embodiment of the present invention in detail with reference to the drawings. The dimensional proportions of the drawings are exaggerated for convenience of explanation and are different from the actual proportions thereof in some cases.

Figure 1:
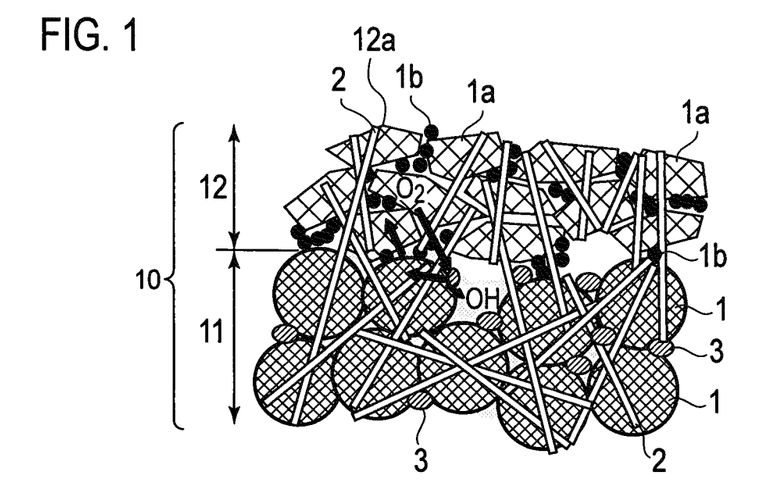
FIG. 1 is a partial cross-sectional view schematically illustrating a microstructure of a positive electrode for air cells according to an embodiment of the present invention.

FIG. 1 schematically illustrates a microstructure of the positive electrode for air cells according to the embodiment. As illustrated in FIG. 1, a positive electrode layer 10 as the positive electrode for air cells of the embodiment includes a catalyst layer 11 and a fluid-tight gas-permeable layer 12, and the fluid-tight gas-permeable layer 12 is stacked on the catalyst layer 11. This specification describes that the fluid-tight gas-permeable layer 12 is staked on the catalyst layer 11 for convenience of explanation. However, the fluid-tight gas-permeable layer 12 only needs to be adjacent to the catalyst layer 11 and to be provided on the side where air intake holes or an air channel to the catalyst layer 11 are provided, that is, the side opposite to the side where the electrolysis solution is provided. Accordingly, the embodiment is unnecessarily limited by the term "stacked".

The catalyst layer 11 contains carbon particles 1 as framework carbon, carbon black 1b as an example of an electrical conductive path material, catalyst particles 3 as a catalyst component, and a binder 2. The carbon particles 1, carbon black 1b, and catalyst particles 3 are bound by the binder 2 to form a porous layer.

The fluid-tight gas-permeable layer 12 contains graphite 1a as an example of the framework carbon, carbon black 1b as an example of the electrical conductive path material, and the binder 2. The graphite 1a and carbon black 1b are bound by the binder 2 to form a porous layer.

In the embodiment, the catalyst layer 11 and fluid-tight gas-permeable layer 12 are bound by the binder 2 to be substantially integrated. The integration can be conducted by integral formation of a later-described method of manufacturing the positive electrode for air cells. In this embodiment, the carbon particles 1, graphite (framework carbon) 1a, and carbon black (electrical conductive path material) 1b are individually composed of electrical conductive carbon.

In this embodiment, filamentous carbon (not shown) composed of electrical conductive carbon can be added to at least one of the catalyst layer 11 and fluid-tight gas-permeable layer 12. The addition of filamentous carbon can increase the mechanical strength, especially, tensile strength of the obtained positive electrode. Preferably, filamentous carbon is added to the fluid-tight gas-permeable layer in particular. Because of the increase in mechanical strength, the fluid-tight gas-permeable layer can be made thinner. This can increase the output of the positive electrode while reducing the electric resistance.

The catalyst layer 11 and fluid-tight gas-permeable layer 12 are porous layers as described above. The fluid-tight gas-permeable layer 12 has a pore diameter and a porosity that allow oxygen in the air to be transmitted therethrough but does not allow electrolysis solution (not shown) to be transmitted. Typically, the pore diameter of the fluid-tight gas-permeable layer 12 is preferably about 0.1 µm to 20 µm, and the porosity thereof is preferably about 10 to 80%. The pore diameter and porosity can be measured by a pore distribution measurement apparatus such as a porosimeter.

In this embodiment, the fluid-tight gas-permeable layer 12 has a high liquid repellency (water repellency) to the electrolysis solution of the air cell, and the repellency of the fluid-tight gas-permeable layer 12 is not lower than that of the catalyst layer 11, that is, equal to or higher than that of the catalyst layer 11. This can sufficiently prevent the electrolysis solution from leaking out of the air cell through the not-shown air intake holes (air holes), air intake channel (air channels), or the like. Moreover, unlike the conventional water-repellent film made of PTFE, the fluid-tight gas-permeable layer 12 has electrical conductivity by the contained graphite 1a as the framework carbon and the contained carbon black 1b as the electrical conductive path material. The fluid-tight gas-permeable layer 12 of the embodiment is extremely advantageous to constitute a series connection-type air cell outputting a large electromotive force as described later.

Figure 2:
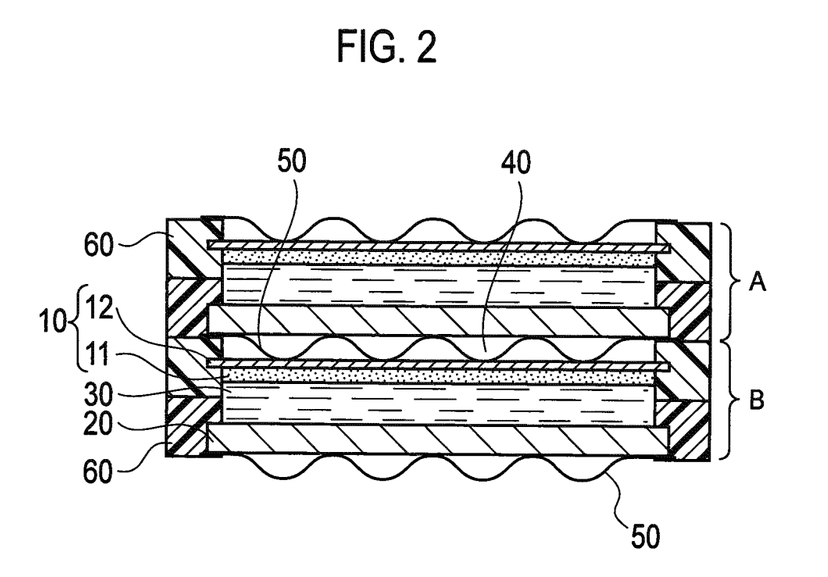
FIG. 2 is a schematic cross-sectional view illustrating an example of a series connection-type air cell including the positive electrode for air cells according to the embodiment of the present invention.

FIG. 2 illustrates an example of battery packs including series connection-type air cells each having the positive electrode for air cells of the embodiment. In the same drawing, in each of air cells A and B constituting the battery pack, the positive electrode layer 10, which includes the fluid-tight gas-permeable layer 12 stacked on the catalyst layer 11, and a negative electrode layer 20 are adjacent to each other with a separator 30 interposed therebetween, the separator 30 being impregnated with the electrolysis solution. The fluid-tight gas-permeable layer 12 of the positive electrode layer 10 is exposed to an air channel 40, so that oxygen in the air is supplied to the catalyst layer 11.

In each of the air cells A and B, a holder 60 is provided in the outer peripheries of the positive and negative electrode layers 10 and 20. The outer peripheries of the positive and negative electrode layers 10 and 20 are integrally joined to the holder 60. This prevents leakage of the electrolysis solution through the joint portion between the holder 60 and the positive and negative electrode layers 10 and 20. The air channel 40 between the air cells A and B is provided with a current collector 50 having a waveform cross-section. The stack structure in which the air cells A and B are stacked with the current collector 50 interposed therebetween is employed as described above to form the battery pack.

In the battery pack of the air cells having the above-described configuration, the fluid-tight gas-permeable layer 12 has electrical conductivity as described above. Accordingly, the negative and positive electrode layers 20 and 10 opposed to each other can be electrically connected only by providing the current collector 50 in the air channel 40 as illustrated in the drawing. Accordingly, the battery pack including the air cells A and B connected in series can be easily obtained. In this case, the negative and positive electrode layers 20 and 10 are in contact with large area of the current collector 50 and can be electrically connected to the current collector 50 almost like via planar connection, thus reducing the electrical conducting loss.

On the other hand, it is impossible to connect conventional air cells using water-repellent film made of polytetrafluoroethylene in series because the water-repellent film is electrically insulating. In other words, even if the air cells are stacked so that the negative electrode of one of the cells and the positive electrode of the other cell are opposed to each other and are electrically connected using a current collector, the electrical conduction between the cells cannot be ensured because the water-repellent film is electrically insulating. Accordingly, it is necessary to provide tabs for electrical connection in the edges (the side surfaces) of the both air cells and connect the tabs to each other. This can increase the electrical conduction loss because only the tabs serve as electrical contacts as well as complicating the manufacturing process.

The positive electrode for air cells of this embodiment is suitable for a series connection-type battery pack having a structure as illustrated in FIG. 2. The series connection-type battery pack having such a structure can easily implement large electromotive force and can be made compact as well as increasing the efficiency of assembly.

In the battery pack illustrated in FIG. 2, the separator 30 is impregnated with the electrolysis solution (not shown). The electrolysis solution only needs to be in contact with the positive and negative electrodes and may be configured to fill the space between the positive and negative electrodes without using the separator 30. Alternatively, the electrolysis solution may be contained in the positive or negative electrodes or may be contained and held in the catalyst layer 11 and negative electrode layer 20.

In the positive electrode for air cells of this embodiment, the fluid-tight gas-permeable layer 12 is also composed of a porous layer and therefore has a good contact with the catalyst layer 11 at the interface between the catalyst layer 11 and fluid-tight gas-permeable layer 12. It is therefore more likely to form a three-phase interface of the catalyst particles 3, oxygen, and electrolysis solution, thus implementing efficient power generation.

In the positive electrode for air cells of this embodiment, the catalyst particles 3 as the catalyst component only need to be contained in the catalyst layer 11 but may be contained in the fluid-tight gas-permeable layer 12. However, from the perspective of preventing leakage of the electrolysis solution through the catalyst particles to the air channel and ensuring the electrical conduction of the current collector, it is preferable that the catalyst particles 3 as the catalyst component are contained in the catalyst layer 11 more than in the fluid-tight gas-permeable layer 12. Typically, the catalyst layer 11 contains preferably 50% by mass or more of the total catalyst amount of the positive electrode for air cells and contains more preferably 70% by mass or more of the total catalyst amount.

The catalyst particles 3 are preferably contained in the fluid-tight gas-permeable layer 12 at a depth of 10 μm or more from a topmost surface 12a thereof. The effects of the present invention can he exerted even when the catalyst particles 3 are contained in a shallower area, that is, in a range of depth less than 10 μm from the top surface 12a of the fluid-tight gas-permeable layer 12. However, if the catalyst particles are contained in the above range, a small amount of electrolysis solution can leak to the air channel through the catalyst particles.

[Relation Between Catalyst Layer and Fluid-tight Gas-permeable Layer]

As described above, the fluid-tight gas-permeable layer 12 has a liquid repellency higher than the catalyst layer 11. Moreover, it is preferable that the softening temperature of the fluid-tight gas-permeable layer is higher than that of the catalyst layer. The reason thereof, which relates to the manufacturing method of the positive electrode for air cells, is because in the process of applying catalyst layer ink to the fluid-tight gas-permeable layer having high strength or attaching and fixing a separately produced catalyst layer to the same, the catalyst layer can be more easily joined to the fluid-tight gas-permeable layer if the catalyst layer is softened. In other words, the catalyst layer 11 is more easily stacked on the fluid-tight gas-permeable layer 12 by lowering the softening temperature of the catalyst layer to make the catalyst layer flexible. The softening temperatures of the fluid-tight gas-permeable layer and catalyst layer can be obtained by measurement of each layer in accordance with JIS K7191-2 (Plastics—Determination of temperature of deflection under load—Part 2: Plastics and ebonite).

The above-described relation in softening temperature between the catalyst layer and fluid-tight gas-permeable layer can be adjusted mainly in accordance with the types and amounts of binders used in the both layers. For example, when the binders used in the both layers are composed of the same material or the same type of materials, the amount of binder in the fluid-tight gas-permeable layer needs to be set higher than the amount of binder in the catalyst layer. When the binders used in the both layers are composed of the same material or the same type of materials, the ratio between the contents of the binders, which can be properly changed in accordance with the type of the binders, is set to a mass ratio of 7/10 to 1/10 (the binder content of the catalyst layer/the binder content of the fluid-tight gas-permeable layer), for example. Employment of the aforementioned ratio between the binder contents facilitates adjustment of the relation in liquid repellency between the fluid-tight gas-permeable layer and catalyst layer because of the liquid-repellent binders.

On the other hand, the binders used in the both layers can be composed of different types of materials. In this case, it is preferable that the softening temperature (Vicat softening temperature, for example) of the binder of the fluid-tight gas-permeable layer is higher than the softening temperature of the binder of the catalyst layer. The difference in softening temperature between the binders used in the both layers can be properly changed in accordance with the intended use of the air cell, the type of electrolysis solution, the type of electrical conductive carbon, and the like. Preferably, the difference in softening temperature between the binders of the fluid-tight gas-permeable layer and catalyst layer is set to about 30 to 250° C., for example. The Vicat softening temperature of the binders can be obtained in accordance with JIS K7206 (Plastics—Thermoplastic materials—Determination of Vicat softening temperature (VST)). Moreover, even when the binders of the both layers are of different types from each other, the contents thereof can be properly adjusted.

[Integration of Catalyst Layer and Fluid-tight Gas-permeable Layer]

In the positive electrode for air cells of the embodiment, the catalyst layer 11 and fluid-tight gas-permeable layer 12 can be integrally formed by the later-described manufacturing method, so that the both layers can be integrated. The integral formation significantly increases the manufacturing efficiency of the positive electrode. Furthermore, the improvement in the characteristics of the interface between the catalyst layer and fluid-tight gas-permeable layer reduces the IR resistance of the positive electrode.

Next, a description is given of the members and constituent materials used in the aforementioned positive electrode and air cell.

[Electrical Conductive Carbon]

The electrical conductive carbon constituting each of the catalyst layer and fluid-tight gas-permeable layer only needs to be a carbon material having electrical conductivity and is not particularly limited. Specifically, the electrical conductive carbon can be at least one selected from the group consisting of activated carbon, graphite, flake graphite, carbon black, and acetylene black other than diamond. The electrical conductive carbon is roughly classified by the functions thereof into framework carbons forming the main framework of the layer structure (the porous layer structure) and electrical conductive path materials useful to form electrical conductive paths in the layer.

The aforementioned filamentous carbon can be also added to at least one of the catalyst layer and fluid-tight gas-permeable layer as the electrical conductive carbon. The filamentous carbon contributes to an increase in mechanical strength, reduction in layer thickness, and reduction in electrical resistance of the catalyst layer and fluid-tight gas-permeable layer. The filamentous carbon can be at least any one selected from the group consisting of carbon nanotubes (CNT), carbon nanofibers (CNF), and vapor grown carbon fibers (VGCF).

Preferably, the framework carbon can be at least one selected from the group consisting of activated carbon, graphite, and flake graphite. These materials have a nature to retain the form of independent particles in a porous layer to a certain degree. By using graphite or flake graphite, many gaps are comparatively more likely to be formed in the porous layer. Accordingly, graphite and flake graphite are particularly suitable for use as the framework carbon of the fluid-tight gas-permeable layer.

On the other hand, the electrical conductive path material tends to aggregate into a chain (string) structure, and the coupled chains tend to function as electrical conductive paths. When the electrical conductive path materials are used together with the framework carbon, in particular, the coupled chains of the electrical conductive path material are easily located in a weaving manner among the gaps formed by the framework carbon in the porous layer. This is extremely useful to enhance the electrical conduction of the porous layer as a whole.

In the later-described manufacturing process of the positive electrode, when positive electrode forming ink (positive electrode forming slurry) is applied, the framework carbon such as graphite or flake graphite tends to be provided so that planar portions and cleavage plane portions are aligned to extend in the direction of the application surface. The provision of the electrical conductive path material between the surfaces of the framework carbon can implement good electrical conduction in the thickness direction of the porous layer.

The electrical conductive path material can be at least any one of carbon black and acetylene black. Acetylene black obtained by pyrolysis of acetylene gas tends to form the aforementioned chain structure, and the surface thereof exerts water repellency. Accordingly, acetylene black is particularly suitable for the electrical conductive path material of the fluid-tight gas-permeable layer.

The particle diameters of the aforementioned framework carbon and electrical conductive path material depend on the air cell, intended electromotive force, and the like. However, typically, the average particle diameter of the framework carbon is preferably within a range between 5 μm and 300 μm, and the average particle diameter of the electrical conductive path material is preferably within a range between 50 nm and 500 nm. Setting the average particle diameter of the framework carbon in the aforementioned range can increase the electrical conduction in the in-plane direction of the framework carbon and the strength of the positive electrode. Moreover, setting the average particle diameter of the electrical conductive path material in the aforementioned range can increase the electrical conduction in the thickness direction of the porous layer and gas permeability of the fluid-tight gas-permeable layer. The average particle diameter (median diameter, D50) of the framework carbon and electrical conductive path material can be obtained by the dynamic light scattering method.

[Binder]

The binders only need to have a function of binding the electrical conductive carbon such as the aforementioned framework carbon and electrical conductive path material to form a porous layer and preferably has repellency to the electrolysis solution, typically, water repellency.

The binders can be: a thermoplastic polymer such as polyethylene (PE), polypropylene (PP), polyethylene terephthalate (PET), polyethernitrile (PEN), polyacrylonitrile (PAN), polyimide (PI), polyamide (PA), cellulose, carboxymethylcellulose (CMC), ethylene-vinyl acetate copolymer, polyvinylchloride (PVC), styrene-butadiene rubber (SBR), isoprene rubber, butadiene rubber, ethylene-propylene rubber, ethylene-propylene-diene copolymer, styrene-butadiene-styrene block copolymer and hydrogenated products thereof, styrene-isoprene-styrene block copolymer and hydrogenated products thereof; fluorine resin such as polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), and polyvinyl fluoride (PVF); vinylidene fluoride based fluorine rubber such as vinylidene fluoride-hexafluoropropylene based fluorine rubber (VDF-HFP based fluorine rubber), vinylidene fluoride-hexafluoropropylene-tetrafluoroethylene based fluorine rubber (VDF-HFP-TFE fluorine rubber), vinylidene fluoride-pentafluoropropylene based fluorine rubber (VDF-PFP based fluorine rubber), vinylidene fluoride-pentafluoropropylene-tetrafluoroethylene based fluorine rubber (VDF-PFP-TFE based fluorine rubber), vinylidene fluoride-perfluoromethylvinylether-tetrafluoroethylene based fluorine rubber (VDF-PFMVE-TFE based fluorine rubber), vinylidene fluoride-chlorotrifluoroethylene based fluorine rubber (VDF-CTFE based fluorine rubber); epoxy resin; or the like. Among the aforementioned substances, polyvinylidene fluoride, polyimide, styrene-butadiene rubber, carboxymethylcellulose, polypropylene, polytetrafluoroethylene, polyacrylonitrile, and polyamide are preferred. The binders may include either one of the above substances or two or more thereof.

Among the aforementioned substances as the binders, from the perspective of heat and chemical resistances, polytetrafluoroethylene (PTFE), polypropylene (PP), tetrafluoroethylene-perfluoroalkylvinylether copolymer (PFA), tetrafluoroethylene-hexafluoropropylene copolymer (FEP), and ethylene-tetrafluoroethylene copolymer (ETFE) are preferably used in particular.

[Catalyst Component]

The catalyst component can be a conventionally-known electrode catalyst for air cell positive electrodes. Specific examples thereof include: metals such as platinum (Pt), ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga), and aluminum (Al); compounds thereof; and alloys thereof. The catalyst component can include either one of the above substances alone or two or more thereof.

The shape and size of the catalyst component are not particularly limited and can be the same shape and size as the conventionally known catalyst components. However, it is preferable that the catalyst component is granular. Moreover, the average particle diameter of the catalyst particles as the catalyst component is preferably within a range between 30 nm and 100 μm. When the average particle diameter of the catalyst particles is in the aforementioned range, the balance between the catalyst utilization, that is associated with an effective electrode surface in which the electrochemical reaction proceeds, and the easy support of the catalyst can be controlled appropriately. The average particle diameter of the catalyst particles can be measured as a crystallite diameter obtained from the full width at half maximum of the diffraction peak of the catalyst component by X-ray diffraction.

[Component Content Ratio in Catalyst Layer and Fluid-tight Gas-permeable Layer]

The content ratio between the electrical conductive carbon, binder, and catalyst components in the catalyst layer can be properly changed in accordance with the electromotive force and usage of the intended air cell and the like. For example, it is preferable that the contents of the electrical conductive carbon, binder, and catalyst components are set to 30 to 85% by mass, 5 to 30% by mass, and 3 to 50% by mass, respectively. When the contents of the electrical conductive carbon, binder, and catalyst components are in the aforementioned ranges, the obtained air cell can provide enough output.

On the other hand, the content ratio between the electrical conductive carbon and binder in the fluid-tight gas-permeable layer can be properly changed in accordance with the electromotive force and usage of the intended air cell or the like. For example, it is preferable that the contents of the electrical conductive carbon and binder are set to 40 to 80% by mass and 20 to 60% by mass, respectively. When the content of the electrical conductive carbon is in the aforementioned range, the fluid-tight gas-permeable layer has enough electrical conduction, and when the content of the binder is in the aforementioned range, the positive electrode has enough strength. The fluid-tight gas-permeable layer may contain the catalyst components, which is as described above.

As for the electrical conductive carbon, it is possible to use the framework carbon and electrical conductive path material together as described above. In the case of using the framework carbon and electrical conductive path material together, the mass ratio of the framework carbon to the electrical conductive path material in the catalyst layer is preferably set to 1/4 to 3/2 (framework carbon/electrical conductive path material). When the mass ratio is in the aforementioned range, the obtained air cell can provide enough output. On the other hand, the mass ratio of the framework carbon to the electrical conductive path material in the fluid-tight gas-permeable layer is preferably set to 1/4 to 4/1 (framework carbon/electrical conductive path material). When the mass ratio is in the aforementioned range, the obtained air cell can have enough strength and provide enough output.

[Negative Electrode]

The negative electrode layer includes a negative-electrode active material composed of a metal or an alloy having a standard electrode potential lower than that of hydrogen, for example. The negative electrode layer can be made of a porous material in some situations. Examples of the metal having a standard electrode potential lower than that of hydrogen include lithium (Li), zinc (Zn), iron (Fe), aluminum (Al), magnesium (Mg), manganese (Mn), silicon (Si), titanium (Ti), chromium (Cr), and vanadium (V). Moreover, alloys using some of the above metal elements are applicable. The negative-electrode active material can include either one of the aforementioned metals alone or two or more thereof.

The alloys collectively refer to substances which are obtained by adding at least one metal element or non-metal element to a metal element and have metal properties. To be specific, the alloys can be substances obtained by adding one or more metal elements or non-metal elements to the aforementioned metal elements. Alloys are classified by the composition into: eutectic alloy as a sort of mixture in which the constituent elements are separately crystallized; solid solution in which constituent elements are completely solved to each other; and an intermetallic compound or a metal-nonmetal compound of constituent elements. In this embodiment, the alloy can employ any one of the aforementioned composition types. However, the alloy is not limited to the aforementioned substances and can be made of conventionally known materials applicable to air cells.

[Separator]

The separator can be composed of a conventionally known material used in air cells. To be specific, in the light of the electrolysis solution which is a solution, the separator can be preferably composed of glass paper not treated for water repellency, microporous film composed of polyolefin such as polyethylene or polypropylene.

[Electrolysis Solution]

The electrolysis solution can be also conventionally known one. Examples of the electrolysis solution are water solutions or non-water solutions of potassium chloride, sodium chloride, and potassium hydroxide.

[Current Collector]

The current collector only needs to have an electric current collecting function and is not particularly limited. The current collector can be made of metal such as stainless steel (SUS), copper, and nickel, for example. The current collector can be also composed of resin coated with an electric conductive material. Moreover, the shape of the current collector is also not particularly limited and can be selected from various types of shapes including wire mesh shape, expanded metal shape, and corrugated sheet shape.

Next, a description is given of the manufacturing method of a positive electrode for air cells of the embodiment. The manufacturing method of the embodiment includes the following steps (A) to (E).

(A) a step of preparing a fluid-tight gas-permeable layer ink for forming the fluid-tight gas-permeable layer and a catalyst layer ink for forming the catalyst layer;

(B) a step of applying the fluid-tight gas-permeable layer ink on a holder, followed by drying, to form a fluid-tight gas-permeable layer precursor;

(C) a step of applying the catalyst layer ink on the fluid-tight gas-permeable layer precursor, followed by drying, to form a catalyst layer precursor;

(D) a step of baking the fluid-tight gas-permeable layer precursor and the catalyst layer precursor to form the fluid-tight gas-permeable layer and catalyst layer;

(E) a step of peeling off the fluid-tight gas-permeable layer and catalyst layer from the holder.

First in the step (A), the fluid-tight gas-permeable layer ink and catalyst layer ink are prepared. The fluid-tight gas-permeable layer ink can be obtained by blending the electrical conductive carbon and binder with a solvent. Moreover, the catalyst layer ink can be obtained by blending the electrical conductive carbon, binder, and catalyst component with the solvent. Preferably, the amounts of the components blended are adjusted as described above. The solvent used to prepare each ink, which is not particularly limited, can be water or alcohol solvent such as methanol, ethanol, 1-propanol, 2-propanol, ethylene glycol, and propylene glycol. Each ink may further contain publicly known surfactants and thickeners if necessary.

Next, in the step (B), the fluid-tight gas-permeable layer ink is applied on the holder and then dried, thus forming the fluid-tight gas-permeable layer precursor. The holder used in the step (B) only needs to have a heat resistance enough to be resistant to drying and baking and is preferably excellent in peelability from the fluid-tight gas permeable layer and catalyst layer. To be specific, the holder can be selected from various types of glass plates, ceramics plates, and heat-resistant resin plates. The drying temperature of the fluid-tight gas-permeable layer ink is not particularly limited but needs to be a temperature high enough to remove the solvent from the ink. Preferably, the drying temperature thereof is set to 80 to 120° C., for example.

In the step (C), the catalyst layer ink is applied onto the solidified fluid-tight gas-permeable layer precursor and is then dried. The catalyst layer precursor is thus formed on the fluid-tight gas-permeable layer precursor. The drying temperature of the catalyst layer ink is not particularly limited but needs to be a temperature high enough to remove the solvent from the ink. Preferably, the drying temperature thereof is set to 80 to 120° C., for example.

Thereafter, in the step (D), the fluid-tight gas-permeable layer precursor and catalyst layer precursor stacked on each other are baked. The baking temperature is not particularly limited but preferably set to 100 to 350° C., for example. The aforementioned drying and baking may be performed either in an inert atmosphere or in the air.

Eventually, in the step (E), the obtained fluid-tight gas-permeable layer and catalyst layer are peeled off from the holder. The positive electrode for air cells according to the embodiment can be thus obtained.

The manufacturing method of the positive electrode for air cells according to the embodiment can include the following steps (A), (B'), (C'), and (E).

(A) a step of preparing a fluid-tight gas-permeable layer ink for forming the fluid-tight gas-permeable layer and a catalyst layer ink for forming the catalyst layer;

(B') a step of applying the fluid-tight gas-permeable layer ink on a holder, followed by drying and baking, to form the fluid-tight gas-permeable layer;

(C') a step of applying the catalyst layer ink on the fluid-tight gas-permeable layer, followed by drying and baking, to form the catalyst layer;

(E) a step of peeling off the fluid-tight gas-permeable layer and catalyst layer from the holder.

As described above, it is unnecessary to bake the fluid-tight gas-permeable layer and catalyst layer at the same time. Accordingly, as shown in the steps (B') and (C'), the fluid-tight gas-permeable layer may be formed by applying the fluid-tight gas-permeable layer ink, followed by drying and baking, before the catalyst layer is formed by applying the catalyst layer ink on the fluid-tight gas-permeable layer, followed by drying and baking. The drying temperature and baking temperature herein can be set to the same temperature as described above.

As described above, the positive electrode of the embodiment can be easily formed by using a method of preparing conventional electrodes for fuel cells. In the manufacturing method of the embodiment, the positive electrode may be formed by joining the fluid-tight gas-permeable layer and catalyst layer which are separately prepared. However, it is preferable that the positive electrode is formed by applying the catalyst layer ink onto the fluid-tight gas-permeable layer or fluid-tight gas-permeable layer precursor, followed by drying and baking, as described above. According to this manufacturing method, the three-phase interface of oxygen, the catalyst component, and the electrolysis solution is more likely to be formed between the fluid-tight gas-permeable layer and catalyst layer, thus increasing the cell output.

EXAMPLES

Hereinafter, the present invention is described in more detail with examples and a comparative example. The present invention is not limited to these examples.

Example 1

First, the constituent materials of the fluid-tight gas-permeable layer and catalyst layer shown in Table 1 below were dispersed in pure water together with a surfactant and a thickener, thus preparing the fluid-tight gas-permeable layer ink and catalyst layer ink.

Next, the obtained fluid-tight gas-permeable layer ink was applied onto a glass plate as a holder sheet using an applicator. The obtained sheet was dried at 80° C. in an oven for one hour and was then baked at 330° C. for one hour. Subsequently, the aforementioned catalyst layer ink was applied onto the fluid-tight gas-permeable layer baked as described above. The obtained product was dried at 80° C. in an oven and was then baked at 330° C. for one hour. Thereafter, the baked fluid-tight gas-permeable layer and catalyst layer were peeled off from the glass plate, thus providing a positive electrode sheet of Example 1. The constituent materials of each layer, the amounts thereof, the number of bakings, and the presence of wire mesh as the current collector are shown in Table 1.

Example 2

First, the constituent materials of the fluid-tight gas-permeable layer and catalyst layer shown in Table 1 below were dispersed in pure water together with a surfactant and a thickener, thus preparing the fluid-tight gas-permeable layer ink and catalyst layer ink.

Figure 3:
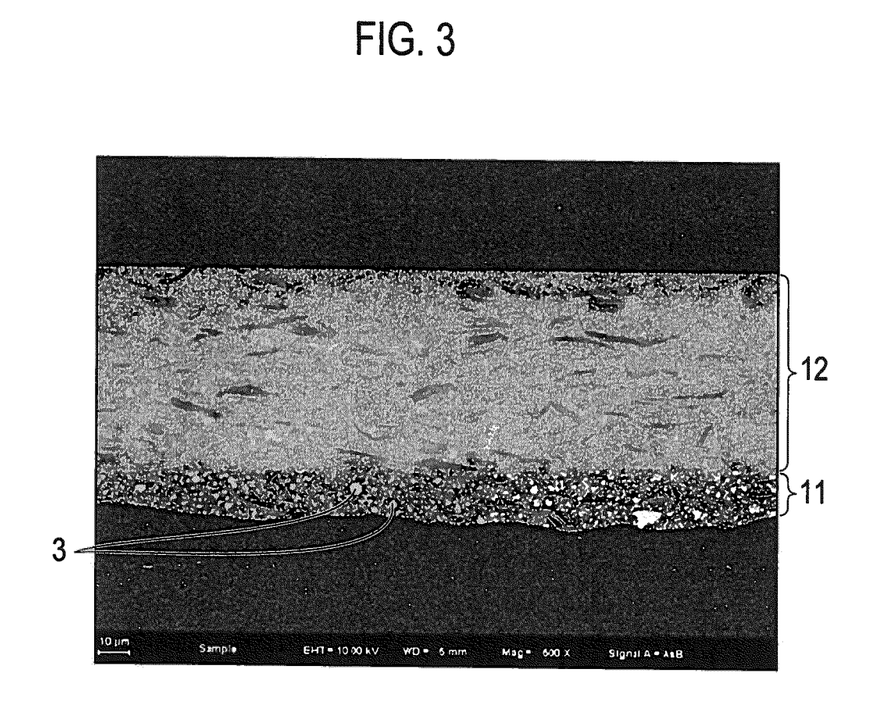
FIG. 3 is a scanning electron micrograph showing a cross section of a positive electrode sheet of Example 2.

Next, the obtained fluid-tight gas-permeable layer ink was applied onto a glass plate as a holder sheet using an applicator. The obtained sheet was dried at 80° C. in an oven for one hour. The aforementioned catalyst layer ink was then applied onto the dried fluid-tight gas-permeable layer and was dried at 80° C. in an oven. The fluid-tight gas-permeable layer precursor and catalyst layer precursor were baked at 330° C. for one hour and were then peeled off from the glass plate, thus providing a positive electrode sheet of Example 2. FIG. 3 shows an image obtained by observation of a cross-section of the positive electrode sheet of Example 2 by a scanning electron microscope.

Example 3

The same operation as that of Example 2 was repeated, thus providing a positive electrode sheet. Next, polyvinylidene fluoride solution was applied to metal mesh. The metal mesh was bonded to the fluid-tight gas-permeable layer side of the positive electrode sheet, followed by drying, thus providing a positive electrode sheet of Example 3. The metal mesh used herein was made of gold-plated SUS304 and had 200 meshes.

Comparative Example 1

Wire mesh (200 meshes) was used as the current collector. The current collector was pressed with powder mixture of constituent materials shown in Table 1 below into the catalyst layer. Next, the obtained catalyst layer and a commercially-available PTFE sheet for air cells were hot-pressed at 330° C., thus providing a positive electrode of Comparative Example 1.

TABLE 1

| | FLUID-TIGHT GAS-PERMEABLE LAYER | | | CATALYST LAYER | | | | PROCESS | |
|---|---|---|---|---|---|---|---|---|---|
| | GRAPHITE (% by mass) | ACETYLENE BLACK (% by mass) | PTFE (% by mass) | GRAPHITE (% by mass) | ACETYLENE BLACK (% by mass) | PTFE (% by mass) | MnOx (% by mass) | NUMBER OF BAKINGS | WIRE MESH |
| EXAMPLE 1 | 15 | 25 | 60 | 24.5 | 24.5 | 30 | 21 | 2 | NOT INCLUDED |
| EXAMPLE 2 | 15 | 25 | 60 | 24.5 | 24.5 | 30 | 21 | 1 | NOT INCLUDED |

TABLE 1-continued

| | FLUID-TIGHT GAS-PERMEABLE LAYER | | | CATALYST LAYER | | | | PROCESS | |
|---|---|---|---|---|---|---|---|---|---|
| | GRAPHITE (% by mass) | ACETYLENE BLACK (% by mass) | PTFE (% by mass) | GRAPHITE (% by mass) | ACETYLENE BLACK (% by mass) | PTFE (% by mass) | MnOx (% by mass) | NUMBER OF BAKINGS | WIRE MESH |
| EXAMPLE 3 | 15 | 25 | 60 | 24.5 | 24.5 | 30 | 21 | 1 | INCLUDED |
| COMPARATIVE EXAMPLE 1 | COMMERCIALLY-AVAILABLE TEFLON SHEET | | | — | 36 | 32 | 36 | — | INCLUDED |

[Performance Evaluation 1]

The positive electrode sheets of Examples 1 to 3 and Comparative Example 1 were used to make beaker cells in which the opposed electrode was a zinc plate (made by Nilaco Corporation) and the electrolysis solution was 8 N potassium hydroxide solution for discharge evaluation. Table 2 shows the results of comparison between outputs from the positive electrode sheets for current density per unit area of the positive electrode sheet.

TABLE 2

| | OUTPUT at 100 mA/cm$^2$ (W/cm$^2$) |
|---|---|
| EXAMPLE 1 | 0.12 |
| EXAMPLE 2 | 0.14 |
| EXAMPLE 3 | 0.15 |
| COMPARATIVE EXAMPLE 1 | 0.1 |

Examples 4 to 8

Positive electrode sheets of Examples 4 to 8 were provided by repeating the same operation as that of Example 1 other than the constituent materials of the fluid-tight gas-permeable layer and the contents thereof. The constituent materials and the contents thereof in the fluid-tight gas-permeable layer of each example are shown in Table 3. Table 3 also shows the constituent materials and contents thereof in the fluid-tight gas-permeable layers of Examples 1 to 3 and Comparative Example 1 together for reference. Table 3 also shows the thicknesses of the positive electrode sheets of Examples 1 to 8 and Comparative Example 1.

In Table 3, "CNF" represents carbon nanofibers, which had a diameter of 40 nm to 90 nm and an aspect ratio of 1000 or more. "VGCF" represents vapor grown carbon fibers, which had a diameter of 150 nm and a fiber length of 10 μm to 20 μm.

[Performance Evaluation 2]

<Tensile Strength>

The positive electrode sheet of each example is subjected to measurement of tensile strength in accordance with JIS 7161. The obtained results are shown in Table 3. The positive electrode sheets of Examples 1 to 3 and Comparative Example 1 are also subjected to measurement of tensile strength in a similar manner.

<Penetration Resistance>

The positive electrode sheets obtained in Examples 1 to 8 and Comparative Example 1 were cut into a diameter of 20 mm for measurement of contact resistance. The device for the measurement was a contact resistance meter. Each of the positive electrode sheets between two electrodes was sandwiched and was subjected to measurement of penetration resistance values (mΩ·cm$^2$) when current of 1 A/cm$^2$ was applied at a measurement surface pressure of 2.0 MPa. The penetration resistance represents an electrical resistance value in the vertical direction to the sheet surface. As the penetration resistance lowers, the discharge loss can be reduced. The obtained results are shown Table 3.

TABLE 3

| | FLUID-TIGHT GAS-PERMEABLE LAYER (% by mass) | | | | THICKNESS (μm) | TENSILE STRENGTH (MPa) | PENETRATION RESISTANCE (mΩcm$^2$) |
|---|---|---|---|---|---|---|---|
| | GRAPHITE | ACETYLENE BLACK | FILAMENTOUS CARBON | PTFE | | | |
| EXAMPLE 1 | 15 | 25 | — | 60 | 70 | 2.81 | 4.47 |
| EXAMPLE 2 | 15 | 25 | — | 60 | 70 | 2.81 | 4.47 |
| EXAMPLE 3 | 15 | 25 | — | 60 | 70 | 2.81 | 4.47 |
| EXAMPLE 4 | 25 | 25 | — | 50 | 80 | 3.34 | 2.55 |
| EXAMPLE 5 | 22.5 | 22.5 | 5 (CNF) | 50 | 30 | 3.95 | 1.56 |
| EXAMPLE 6 | 22.5 | 22.5 | 5 (CNF) | 50 | 60 | 5.16 | 2.37 |
| EXAMPLE 7 | 17.5 | 17.5 | 15 (CNF) | 50 | 60 | 5.10 | 3.02 |
| EXAMPLE 8 | 22.5 | 22.5 | 5 (VGCF) | 50 | 60 | 3.72 | 2.01 |
| COMPARATIVE EXAMPLE 1 | — | — | — | 100 | 100 | 30 | — |

Table 3 reveals that the tensile strength (mechanical strength) is increased by adding filamentous carbon to the fluid-tight gas-permeable layer. Accordingly, the fluid-tight gas-permeable layer can be made thinner by adding the filamentous carbon. Example 5, whose thickness is a half of the thickness of Example 4, achieved the same tensile strength. As the thickness of the positive electrode gets smaller, the resistance lowers, and the positive electrode can provide higher output power.

The entire contents of Japanese Patent Application Nos. 2012-094529 (filed on: Apr. 18, 2012) and 2013-43660 (filed on: Mar. 6, 2013) are incorporated herein by reference.

Although the present invention has been described above by reference to the embodiments and the example, the present invention is not limited to those, and it will be apparent to these skilled in the art that various modifications and improvements can be made.

INDUSTRIAL APPLICABILITY

The positive electrode for air cells of the present invention is produced by stacking the catalyst layer and fluid-tight gas-permeable layer which are formed by using the electrical conductive carbon and binders. This can prevent leakage of the electrolysis solution from the positive electrode while facilitating series connection of the air cells and increasing the manufacturing efficiency and handleability.

REFERENCE SIGNS LIST

1 CARBON PARTICLE (ELECTRICAL CONDUCTIVE CARBON)
1a GRAPHITE (ELECTRICAL CONDUCTIVE CARBON, FRAMEWORK CARBON)
1b CARBON BLACK (ELECTRICAL CONDUCTIVE PATH MATERIAL)
2 BINDER
3 CATALYST PARTICLE (CATALYST COMPONENT)
10 POSITIVE ELECTRODE LAYER (POSITIVE ELECTRODE FOR AIR CELLS)
11 CATALYST LAYER
12 FLUID-TIGHT GAS-PERMEABLE LAYER

The invention claimed is:

1. A battery pack, comprising:
at least two air cells;
a current collector; and
an air channel provided with the current collector;
each of the at least two air cells comprising
  a positive electrode, comprising
    a catalyst layer comprising a porous layer containing electrical conductive carbon, a binder, and a catalyst component; and
    a fluid-tight gas-permeable layer comprising a porous layer containing electrical conductive carbon and a binder, the fluid-tight gas-permeable layer being exposed to the air channel and the current collector,
wherein the fluid-tight gas-permeable layer is stacked on the catalyst layer,
wherein the electrical conductive carbon included in the fluid-tight gas-permeable layer includes
  a framework carbon configured to form a framework of a layer structure and to retain a form of independent particles in the porous layer of the fluid-tight gas-permeable layer, and
  an electrical conductive path material forming an electrical conductive path,
wherein the at least two air cells comprise a first air cell and a second air cell, the air channel and the current collector being between the first air cell and the second air cell,
wherein the current collector is disposed in the space of the air channel and extends along the entire air channel, and
wherein the fluid-tight gas-permeable layer contains a catalyst component, and a content of the catalyst component in the catalyst layer is larger than a content of the catalyst component in the fluid-tight gas-permeable layer.

2. The battery pack according to claim 1, wherein the binder of the fluid-tight gas-permeable layer is made of a same type of material as the binder of the catalyst layer, and
  a content of the binder of the fluid-tight gas-permeable layer is larger than a content of the binder of the catalyst layer.

3. The battery pack according to claim 1, wherein the binder of the fluid-tight gas-permeable layer is made of a different kind of material from the binder of the catalyst layer, and
  the binder of the fluid-tight gas-permeable layer has a softening temperature higher than that of the binder of the catalyst layer.

4. The battery pack according to claim 1, wherein the fluid-tight gas-permeable layer and the catalyst layer are integrally formed.

5. The battery pack according to claim 1, wherein the electrical conductive carbon included in the catalyst layer includes:
  a framework carbon constituting a framework of a layer structure; and an electrical conductive path material forming an electrical conductive path.

6. The battery pack according to claim 5, wherein the electrical conductive carbon included in the catalyst layer further includes filamentous carbon.

7. The battery pack according to claim 6, wherein the filamentous carbon is at least any one selected from the group consisting of carbon nanotubes, carbon nanofibers, and vapor grown carbon fibers.

8. The battery pack according to claim 5, wherein the framework carbon included in the catalyst layer is graphite.

9. The battery pack according to claim 8, wherein the graphite is flake graphite.

10. The battery pack according to claim 5, wherein the electrical conductive path material included in the catalyst layer is carbon black.

11. The battery pack according to claim 10, wherein the carbon black is acetylene black.

12. The battery pack according to claim 1, wherein the fluid-tight gas-permeable layer is adjacent to the catalyst layer.

13. The battery pack according to claim 1, wherein the framework carbon is selected from the group consisting of activated carbon, graphite and flake graphite.

14. The battery pack of claim 1, wherein:
the first air cell and the second air cell are provided in series.

15. The battery pack of claim 1, wherein:
the first air cell is stacked atop the second air cell.

16. The battery pack of claim 1, wherein:
the fluid-tight gas-permeable layer is directly exposed to both the air channel and the current collector.

17. The battery pack of claim 1, wherein:
the current collector has a waveform cross-section.

18. A method of manufacturing a battery pack according to claim 1, comprising:
preparing a fluid-tight gas-permeable layer ink for forming the fluid-tight gas-permeable layer and a catalyst layer ink for forming the catalyst layer;
applying the fluid-tight gas-permeable layer ink on a holder followed by drying to form a fluid-tight gas-permeable layer precursor;
applying the catalyst layer ink on the fluid-tight gas-permeable layer precursor followed by drying to form a catalyst layer precursor;
baking the fluid-tight gas-permeable layer precursor and catalyst layer precursor to form the fluid-tight gas-permeable layer and the catalyst layer; and
peeling off the fluid-tight gas-permeable layer and catalyst layer from the holder.

19. A positive electrode for an air cell, comprising:
a catalyst layer comprising a porous layer containing electrical conductive carbon, a binder, and a catalyst component; and
a fluid-tight gas-permeable layer comprising a porous layer containing electrical conductive carbon and a binder, the fluid-tight gas-permeable layer being directly exposed to both an air channel and a current collector extending along the entire air channel, the current collector being disposed in the space of the air channel,
wherein the fluid-tight gas-permeable layer is stacked on the catalyst layer,
wherein the electrical conductive carbon included in the fluid-tight gas-permeable layer includes
a framework carbon constituting a framework of the porous layer of the fluid-tight gas-permeable layer, and configured to retain a formation of independent particles in the porous layer of the fluid-tight gas-permeable layer, and
an electrical conductive path formed of an electrical conductive path material, and
wherein the fluid-tight gas-permeable layer contains a catalyst component, and a content of the catalyst component in the catalyst layer is larger than a content of the catalyst component in the fluid-tight gas-permeable layer.

* * * * *